United States Patent [19]
Karki

[11] 4,123,591
[45] Oct. 31, 1978

[54] PROCESS FOR FORMING AN OPTICAL BLACK SURFACE AND SURFACE FORMED THEREBY

[75] Inventor: Kenneth A. Karki, Lakewood, Colo.

[73] Assignee: Martin Marietta Corporation, Bethesda, Md.

[21] Appl. No.: 778,031

[22] Filed: Mar. 16, 1977

[51] Int. Cl.$^2$ ................................................ G02B 1/10
[52] U.S. Cl. .................................. 428/454; 428/446; 428/448; 428/450; 428/469; 428/428; 428/913; 427/160; 427/162; 427/372 B; 427/380; 427/427; 427/236; 106/84; 350/276 SL
[58] Field of Search ............... 427/372 B, 160, 344, 427/64, 239, 236, 162, 380, 427; 428/450, 913, 454, 446, 448, 469, 428; 106/74, 84; 350/276 R, 276 SL; 148/627

[56] References Cited

U.S. PATENT DOCUMENTS

| | | | |
|---|---|---|---|
| 2,076,183 | 4/1937 | Michaud et al. | 427/372 B |
| 3,070,460 | 12/1962 | Huppke | 428/450 |
| 3,249,459 | 5/1966 | Arnold et al. | 428/450 |
| 3,326,715 | 6/1967 | Twells | 427/372 B |
| 3,940,511 | 2/1976 | Deal et al. | 427/64 |

*Primary Examiner*—Ralph S. Kendall
*Attorney, Agent, or Firm*—Gay Chin; George W. Moxon, II

[57] ABSTRACT

A method of making an optically black surface having a low reflectance of electromagnetic radiation, especially in the solar spectrum, a relatively high heat resistance, and a relatively low amount of off-gassing and an optically black surface made by the method which includes the steps of (a) Milling the following mixture of ingredients for up to about 25 minutes:

| Ingredient | Amount (% by weight) |
|---|---|
| Alkali metal silicate | 13–21 |
| Black pigment | 17–27 |
| Kaolin | 0–5 |
| Mica | 0–3 |
| Water | 50–70 |

(b) Coating the surface to be rendered optically black
  (1) by applying at least four or five coats of an inorganic composition comprised primarily of an alkali metal silicate and pigment, and
  (2) by spraying at least the last two surface coatings, and having them comprise the above milled mixture, and
(c) Drying at least the coats prior to the last two coats, before applying the last two coats.

49 Claims, No Drawings

PROCESS FOR FORMING AN OPTICAL BLACK SURFACE AND SURFACE FORMED THEREBY

BACKGROUND OF THE INVENTION

This invention relates to optical coatings and surfaces and methods of making optical surfaces, and in particular, to inorganic, optical, black, silicate coatings and surfaces and methods of making such surfaces.

Optical coatings and surfaces are known and are used in instances where low light reflectivity, or conversely high light absorptivity, is required, that is, surfaces which absorb a substantial portion of the electromagnetic radiation, especially in the solar spectrum, to which they are exposed. The highest absorptivity is achieved with black coatings and surfaces. Uses for optical coatings and surfaces include the interiors of solar telescopes, binoculars, camera bodies, and the like, where reflected radiation will interfere with the radiation being observed or measured and solar panels where radiation, such as solar energy, is absorbed for conversion into some other form of energy, such as heat or electricity.

There has been much development work in the area of providing and developing metal bodies having a surface finish such that they absorb an extremely high percentage of ultra-violet, visible and infrared radiation, and therefore only a very low percentage of such radiation is reflected therefrom. Some of the development work has involved processes for treating the surface of the body involved to improve its optical character, and some has involved coatings and coating processes which result in improved optical characteristics for the surface of the body.

Among the known coatings for producing optical, especially black, surfaces are the organic black coatings and the so-called high temperature black coatings. The most well known of the organic coatings is the 3M (Minnesota Mining and Manufacturing Company) Nextel black velvet coating or paint which has a composition by weight of approximately 16% pigment and 84% organic vehicle (basically a polyester base material). The pigment comprises approximately 20% carbon black and approximately 80% silicon dioxide. This material is commonly used for coatings in optical instruments such as telescope tubes, camera housings, vacuum chamber walls, etc.

In addition to the 3M Nextel black velvet paint, another well-known high absorbent of visible and infrared radiation is Parson's black. Parson's black consists of an alkyd lacquer containing carbon black. The carbon black, which is a powdery material, is adhered to the surface of a body to give that surface a high radiation absorption capability. Parson's black is, in general, a better visible and infrared absorbent than 3M Nextel black velvet paint.

Other optically black organic coatings have been developed, but they differ basically in the type of vehicle employed, such as epoxy and acrylic base coatings. None of the other organic black coatings, to applicant's knowledge, achieve the high degree of absorbency of visible and infrared radiation as does the 3M Nextel black velvet paint and Parson's black.

The 3M Nextel black velvet paint and Parson's black, both of which, as noted above, are known for their high absorption capability of visible and infrared radiation, have a substantial shortcoming in their lack of durability. The 3M black velvet paint is subject to chipping after moderate temperature exposure and hydrocarbon outgassing, both of which detrimentally affect the desirability of the product. In addition, because the organic binder will degrade at elevated temperatures, the organic coatings are restricted to low temperature applications. Further, Parson's black, which contains a relatively high percentage of powdery carbon black, also lacks durability, being very easily removed from any surface on which it is applied.

The so-called high temperature black coatings are not entirely free from the problems of organic binders since they basically comprise an organic material having inorganic components which are deposited as a residue. An example is the silicone resin based "high temperature" coating, which is commercially available. The inorganic surface is formed by coating a silicone resin on the substrate which is to have the optical surface, heating the coating to about 600° F. to 1000° F. to burnoff the organic binder which leaves an inorganic residue, and then heating the residue to in excess of 1000° F. to sinter the residue and thus form an inorganic layer on the substrate. Such a coating is inorganic and so will avoid generally the off-gassing problems associated with organic coatings, but such a coating process requires a large amount of expensive high temperature processing equipment, as well as processing steps, and if not properly heat treated, an organic residue may remain. Further, in order to avoid the formation of heat scale, which is associated with ferrous alloys during the high temperature treatment step, e.g., on the inside of tubes which are being optically coated, a means is required to protect the inside of the tubes, such as an inert gas purge inside the tubes or the like treatment, which only adds to the complexity and expense of the process.

Silicate coatings, such as sodium and potassium silicate, are well known for such purposes as high temperature resistance and corrosion resistance. Silicate coatings normally are not noted for their optical qualities, and in fact, are considered to have only average absorptivity or reflectivity levels. Often, silicate coatings are used as a primer, i.e., a protective coating which precedes the ultimate surface coating of paint. Further, while silicate coatings are inorganic and thus do not suffer from the problems of organic coatings, they are known, depending upon the formulation, to suffer from problems of durability and moisture resistance. Examples of silicate coatings are U.S. Pat. Nos. 2,076,183; 2,711,974; 3,416,939; 3,615,282; 3,620,791; and 3,769,050; and British patent specification No. 643,345.

U.S. Pat. No. 2,076,183 is of particular note because it discloses a heat resistant, permanent black, sodium silicate finish. But, such a coating would not be considered an optical black coating in that it would not have a sufficiently high solar absorptivity, especially as compared to, e.g., 3M Nextel velvet black. Thus the black of U.S. Pat. No. 2,076,183 would only be a general purpose black.

Thus, a need exists for an optical coating and surface which has a high absorptivity, and thus, a low reflectance of electromagnetic radiation, especially in the solar spectrum, and does not suffer from problems such as off-gassing or chipping or high temperature degradation.

SUMMARY OF THE INVENTION

The present invention is to an optical coating and surface and method of making an optical surface, and in particular to an inorganic, optical black, silicate coating and surface and method of making such a surface.

In accordance with the present invention, an optical surface is achieved which is equal to and/or exceeds the optical characteristics of the organic black coated surfaces, while using, in certain specified amounts, ordinary alkali metal silicates, so that the off-gassing and other problems associated with organic coatings are avoided. Further, the optical coating and surface of the present invention is tough and durable, such that, when it is handled, its optical properties will not necessarily be significantly impaired, and so that it can be used in high temperature environments. Also, the optical surface of the present invention can be readily repaired or refurbished without undergoing an extensive repair process or the necessity of stripping the old surface and beginning anew to recreate the optical surface.

Broadly, the invention comprises mixing an alkali metal silicate, a black pigment, water, and optionally kaolin and mica in the following proportions:

| Ingredient | Amount (% by weight) |
| --- | --- |
| Alkali metal silicate | 13–21 |
| Black pigment | 17–27 |
| Kaolin | 0–5 |
| Mica | 0–3 |
| Water | 50–70 |

The mixing is done in a ball mill for a period of between about 10 minutes to 20 or 25 minutes.

Next, the surface of a substrate to be rendered optically black is coated with at least four or five coats of an inorganic mixture of alkali metal silicate solution and black pigment, which could be the above inorganic mixture, including spraying at least the last two coats, which must comprise the above mixture, after having allowed at least all of the coats prior to the final two coats to dry, such as for a period of about at least 2 to 4 hours in situ or for a period of about 3 to 5 minutes at between about 150° F. and 180° F. It may be desirable to prepare the surface prior to the coating by subjecting it to a roughening step to improve and/or to enhance the adhesion of the silicate coating to the substrate.

The resulting surface will have a solar absorptivity ($\alpha_s$) of in excess of 97% and in some of the preferred embodiments, in excess of 98%, while not suffering from the off-gassing problems associated with organic, optical black coatings, and being able to withstand relatively high temperatures. For example, with the preferred embodiments, temperatures in excess of 1000° F. did not produce any detrimental effects on the coating. Thus, the method and coated surface in accordance with the teachings of this invention are useful for coating solar absorptive materials, such as solar panels, or materials where low reflectance is required, such as in a camera or solar telescope.

The following are preferred embodiments wherein the silicate mixture comprises the following:

| Ingredient | Amount |
| --- | --- |
| Mixture A | |
| Sodium silicate solution | 200 milliliters |
| Black pigment | 175 grams |
| Water | 225 milliliters |
| Mixture B | |
| Potassium silicate solution | 280 ml |
| Black pigment | 168 gr |
| Water | 170 ml |
| Mixture C | |
| Sodium silicate solution | 160 ml |
| Black pigment | 130 gr |
| Kaolin NF | 10 gr |
| Mica (water white; 325 mesh) | 10 gr |
| Water | 125 ml |

In these mixtures or embodiments the sodium silicate solution comprises about 62% water, has a weight percentage ratio of $Na_2O$ to $SiO_2$ of about 1:3.22. The potassium silicate solution has a weight percentage ratio of $K_2O$ to $SiO_2$ of about 1:2.50 and comprises about 71% by weight water. The black pigment comprises the black oxides of manganese, copper and iron. In embodiments A and B the entire mixture is ball milled for about 15 minutes. In embodiment C, the mixture, without the black pigment, is ball milled for about 1 hour before the pigment is added, after which the mixture is ball milled for an additional period of about 25 minutes. Further, the coated surface is subjected, essentially immediately after it is coated on, to a further heating step of about 250° C. to about 350° C. for about 10 to 30 minutes. When mixture A is applied in the manner taught by this invention, a solar absorptivity of at least 97%, and as high as 98%, can be achieved. Potassium silicate is not as moisture resistant at high temperatures as is the sodium silicate, but it is nonetheless useful and desirable because when this coating is applied in the manner taught by this invention, a solar absorptivity of from 97% can be achieved. Thus, mixture B could be employed in low moisture environments. When applied in the manner taught by this invention, mixture C achieves a solar absorptivity equal to or in excess of 97%, and additionally has a greater resistance to moisture attack.

Thus, the present invention provides an optical surface which has a high absorptivity, especially in the solar spectrum, and does not suffer from the problems, such as off-gassing or chipping or high temperature degradation, associated with the organic optical coatings.

It is therefore an object of the present invention to provide an improved optical surface.

It is a further object of the present invention to provide a method of making an optical surface.

It is another object of the present invention to provide an inorganic, optical black coating and surface, which can be used at elevated temperatures without suffering from off-gassing problems.

It is yet another object of the present invention to provide a method of coating a surface which produces an inorganic, optical black surface which can be used at elevated temperatures without off-gassing.

These and other objects and advantages of the invention will become apparent upon consideration of the description and discussions which follow.

DETAILED DESCRIPTION OF THE INVENTION

Generally, the coating composition comprises an alkali-metal silicate, such as a sodium or potassium or lithium silicate, in a water solution, and a black pigment such as the black oxides of manganese, iron and copper. By ball milling the mixture in the manner which will b hereinafter set forth and applying at least four or fiv coats of the mixture in the manner to be discussed fur ther below, the mixing/ball milling and applying steps being the essence of this invention, an inorganic, optical black coating which is durable and has a high solar absorptivity equal to or in excess of 97% is obtained.

The alkali-metal silicate can be any of the commercially available, low alkali, alkali-metal silicate solutions, will comprise about 13 to 21% by weight of the coating mixture, can have a weight percentage ratio of alkali-metal oxide to silicon dioxide in the range of 1:2.10 to 1:3.75, and will comprise about 50% by weight to 75% by weight water. Additionally, the coating mixture will contain 50% to 70% by weight water. Part of the water is contributed by the silicate solution, and so an additional amount of water is added to the coating mixture so that it will achieve a coatable/sprayable consistency. The preferred silicate solution is sodium silicate solution, although potassium or lithium silicate solutions could be employed.

The black pigment preferably comprises the black oxides of manganese, copper and iron produced by the co-calcination of compounds of these metals which yield their oxides during calcination, such as is disclosed in U.S. Pat. No. 2,811,463. Other black pigments could be employed, but the black oxides of Mn, Fe and Cu produced the best results when used in accordance with the teachings of the present invention. The pigment comprises about 17 to 27% by weight of the mixture. If more than 27% by weight pigment is employed, the coating is difficult to control and a slight overspray can lead to spalling of the coating when rubbed by hand.

As disclosed in U.S. Pat. No. 2,811,463, the pigment can be made by directly calcining the oxides or those compounds of manganese, copper and iron which yield their oxides upon calcination or by first coprecipitating and then calcining, and comprises from 20 to 80 parts by weight of MnO, from 20 to 80 parts by weight of CuO and from 5 to 50 parts by weight of FeO.

The mixture of basically a silicate, pigment and water is both mixed and ground (i.e., somewhat reduced in size) by ball milling or the like the mixture. The ball milling can be done in any conventional manner using a commercially available ball mill and balls or cylinders. For example, a convenient size would be ½ diameter by ½ inch long cylinders or ½ to 1 inch diameter balls. What is critical in the process of the present invention, and to achieve an optical surface in accordance with the present invention, is the length of time to which the mixture, which is subsequently applied as the final surface coats, especially when it includes the pigment, is subjected to ball milling. When the mixture comprises silicate, pigment and water, i.e., the mixture without kaolin and mica, the ball milling should not exceed 20 minutes, preferably in the range of from about 10 minutes to about 20 minutes. When the mixture also includes kaolin, with or without mica, the mixture without the pigment can be ball milled for up to or in excess of about 3 hours and, after the pigment is added, for an additional time of up to about 25 minutes. The initial ball milling when kaolin is present is not critical and is done so that the mixture will be sprayable, and so a period of up to 3 hours is only exemplary. Thus while there is no criticality in the ball milling equipment employed, the length of time involved when the pigment is present is critical and is much less than is employed for conventional paints, including silicate coatings.

The mixture is preferably applied to the surface to be rendered optically black by spraying, although it is the top two layers which must be within the critical limits in terms of content and ball milling, and also must be sprayed. That is, some of the layers or coats could be applied by brushing or rubbing or roll coating the mixture, using conventional brushing or rubbing or roll coating means, or could contain less pigment than the critical limits or could be ball milled in excess of the critical limits, but the top two coats must be within the critical composition, mixed within the critical limits, and be sprayed. If the top coats are not sprayed, the surface will have an irregular surface, e.g., brush marks if a brush is used, and will not achieve the desired optical qualities and characteristics. Any conventional spraying apparatus can be employed. Normally, a larger nozzle, e.g., one which is used for zinc rich sprays, is employed in view of the granular nature of the mixture.

There is no criticality in the spraying process per se, and conventional spraying techniques can be employed. That is, enough of the mixture is sprayed on to form a layer or coat. With the mixtures which do not contain kaolin, the spraying should be on the dry side, i.e., so that the coating is not a shiny, wet coating (a condition known in the spray painting art), but the coating is too dry if the spraying should produce an overspray condition (also known in the spray painting art). With the kaolin containing coating, a wet coating would be acceptable. As is conventional in the art, each coat or layer is allowed to become dry to the eye, e.g., air dry for about five minutes, before applying the next coat, or else caking and running will occur. This is continued until there are 4 or 5 coats, which would amount to a total coating thickness of about 2 to about 3 mils. When the mixture comprises the mixture which contains kaolin, four coats will be enough, and when it is the mixture without kaolin, there should be five coats.

What is critical in the process of invention, in addition to there being at least about 4 or 5 coats, and the last two coats being within the critical ranges of contents and ball milling, is that the coats before the last two coats be allowed to dry before applying these last two coats. The term drying is intended to include drying the coating enough so that a substantial amount of the moisture in the coating is removed and the silicate coating is at least partially cured and this would include allowing the coats to dry at ambient temperature and relative humidity for about 2 to 4 hours, drying the coats for a period of 3 to 5 minutes at 180° F. at up to about 50% relative humidity, or combination thereof. If the coating is not dried, e.g., if all of the coats were applied without a drying step before the last two coats, the surface would not achieve the desired optics. That is, the substrate would tend to show through and the surface would not achieve the desired absorptivity.

The surfaces to which the mixture can be applied include metals, glass and porcelains or ceramics. The preferred surfaces are metals, with steel, aluminum and copper being the preferred metals. It is best to pretreat the surface so that the adherence of the silicate coating is enhanced. This would include cleaning the surface and, in the instance of the metals, roughening the surface. The surface can be cleaned using conventional surface cleaning techniques, such as ultrasonic vibration or solvent cleaning, e.g., using a methyl-ethyl ketone solvent. The surface can be roughened using conventional roughening techniques, such as vapor honing or sand blasting and chemical etching, such as with an alkali or an acid solution, and preferably followed by a de-smutting step, such as with a chromic acid/nitric acid de-smutting solution. For example, when the surface is steel, it can be roughened by bombarding it with grit, such as alumina or silicon carbide grit delivered using pressurized air. When the surface is aluminum, a chemical etch should be sufficient. Thus, while surface roughening, in the case of metals, is preferred and desirable, it is not critical.

After the coating is applied, it is simply allowed to dry. The more completely the water is removed, the greater the resistance of the coating to rehydration. Alternatively, the silicate coating can be insolublized by chemical treatment, such as reacting the coating with acid or solutions of heavy metal salts, such as calcium, magnesium and aluminum, as is known in the silicate coating art. But, chemical treatment is not preferred since it reduces somewhat the surface optics of the coating and, although improving the moisture resistance of the coating, results in a more brittle coating.

In addition as has been discussed hereinabove, reactive clays, such as kaolin, can be incorporated into the mixture to increase its moisture resistance. The use of kaolin in the silicate coatings is known. But, in the coatings of the present invention, it is critical that the amount of kaolin must not exceed 5% by weight or a brittle coating will result. Further, the kaolin containing coatings of the present invention must be heat cured, e.g., heated to between about 250° C. and about 350° C. for 10 minutes to about 30 minutes, essentially immediately after the coating step. Still further, with the kaolin containing coatings, it may be desirable to incorporate some mica, e.g., water white mica having a 325 mesh particle size, into the mixture, to improve the handling of the mixture.

The method of preparing the mixture and coating the mixture can be varied, within certain limitations, to provide the desirable ingredients in the proper proportions and achieve the desired surface characteristics. Therefore, the following examples are provided to illustrate further the invention, while not intended to limit the scope of the invention in any way.

EXAMPLE I

The following mixture of ingredients were ball milled:

| Ingredient | Amount |
|---|---|
| Silicate solution | 200 ml |
| Black pigment | 175 gr |
| Distilled water | 225 ml |

The silicate solution was "N" silicate solution, a commercially available silicate sold by the Philadelphia Quartz Company, comprising sodium silicate solution having a weight percentage ratio of soda to silica (i.e., %$Na_2O$ to %$SiO_2$) of 1:3.22 and comprising 62.4% water. The black pigment was Ferro black pigment No. F6331, which comprises the black oxides of manganese, iron and copper and which is taught by U.S. Pat. No. 2,811,463.

The mixture was placed in a one liter polypropylene jar which had been filled to approximately ¼ full with a pound of ¼ inch diameter by ¼ inch tall ceramic cylinders. The mixture and cylinders filled the jar to approximately ¾ full. The jar was then rotated about its axis at a speed of 90 to 100 rpm for a period of about 15 minutes. The mixture had achieved a sprayable consistency.

Next, the mixture of Example I was coated on an aluminum panel which had been subjected to a chemical milling with a caustic soda (NaOH) etch followed by a de-smutting step. The mixture of Example I was preceded by three rub coats and two spray coats of mixture of the same ingredients as in Example I, except that the mixture was ball milled for between 3 and 4 hours. In a rub coat, a sponge containing the coating material is rubbed across the metal surface and leaves a thin coating equal to about one-half of a spray or brush coat. The mixture of Example I was then applied by spraying on four coats with a drying step (3-5 minutes in an oven at between 180° F. and 150° F.) before the last two coats were sprayed on. In addition, two other aluminum panels were prepared by subjecting them to chemical milling and de-smutting and then coating them with commercially available organic black coatings. The Black Velvet is a 3M coating, and it was applied in two coats according to the manufacturers instructions. 107-66Z-poxy is an epoxy black manufactured by Andrew Brown and it was applied in one coat. The solar absorptivity of each coated panel was measured using a Beckman DK-2A ratio recording spectrophotometer with Gier-Dunkle integrating sphere. Reflectance readings are obtained, and 1.0 minus reflectance gives absorptance. An absorptivity value of 1.0 would mean that the surface was totally light absorptive. The results of the tests are set forth in Table I. It should be noted that these measurements were made at Air Mass Zero (AM-0) which is equivalent to that found in outer space. At AM-2, which is what one would find in North America, the absorptivity values would be higher.

Table I

| | Solar Absorptance $\alpha_s$ at AM-O | | |
|---|---|---|---|
| | 15° | 30° | 45° |
| Example I | 0.985 | 0.984 | 0.982 |
| Black Velvet | 0.975 | 0.972 | 0.967 |
| 107-66Z-poxy | 0.950 | 0.946 | 0.934 |

EXAMPLE II

An aluminum panel was prepared by subjecting it to a chemical etch. Next, the panel was coated by applying two rub coats of a mixture similar to that of Example I except that it contained only 75 gr. of pigment (instead of 175 gr.) and two spray coats of a similar mixture except that it contained only 125 gr. of pigment, and each of these coatings were mixed in one pass on a roll mill such as would be equivalent to the mixing in a ball mill. The use of a roll mill is an alternative to the use of a ball mill, but the ball mill is preferred since it is easier to control the amount of mixing and grinding of the mixture. Next, five coats of the mixture of Example I, except that it had been mixed on a roll mill for a period equivalent to ball milling for 15 minutes, were spray coated on the panel with a drying step (air dried for about 2 hours) prior to the application of the last three coats.

The absorptivity of the thus coated panel was measured at AM-O and was determined to be as follows: 0.975 at 15°; 0.974 at 30°; and 0.971 at 45°.

In addition, a portion of the coating was scraped off (representative sample of all of the layers of the coating), using an exacto knife, and placed in a platinum crucible (the sample was approximately 21 mg.) for a thermogravimetric analysis/residual gas analysis (TGA/RGA) in order to determine the outgassing (or off-gassing) characteristics of the coating. This test, the results of which are set forth in Table II, shows that, unlike organic coatings, which give off organic combustion or degradation products which could foul, e.g., a window placed over the coating, the coatings of the present invention do not result in organic condensates.

Still further, two panels, one an aluminum panel which had been prepared by a chemical etch and the other a stainless steel panel which had been prepared by vapor honing, were coated with the coating and in the manner of Example II and were subjected to a thermal shock test.

In the thermal shock test, a coated steel or aluminum panel was plunged into liquid nitrogen ($LN_2$ at $-300°$ F.) and removed to air when bubbling of the $LN_2$ stopped, indicating equilibrium. Generally upon removal, white spots were formed on the surface which disappeared as the panels warmed up. The spots were believed to be water vapor or $CO_2$ condensed from the air. In some instances, the surface was slightly mottled, possibly due to localized spalling. Spalling can occur when the water inherent in the coating freezes and expands, or when liquid nitrogen permeates into surface voids and expands upon warming. The conclusion of the test is that the coating was considered to have remained generally and satisfactorily adhered to both panels, and remained essentially black, and therefore is a stable and tough coating.

TABLE II

| Temperature °C | Weight Loss, % | Outgassing Masses |
|---|---|---|
| 50 | 0.0 | water |
| 100 | 1.15 | water & carbon dioxide[1] |
| 200 | 2.99 | water & carbon dioxide |
| 300 | 4.40 | carbon dioxide |
| 400 | 5.27 | — |
| 500 | 5.51 | carbon dioxide (trace) |
| 600 | 5.65 | oxygen or sulphur |
| 700 | 5.98 | oxygen or sulphur |
| 800 | 6.46 | oxygen, carbon dioxide, & undetermined inorganic[2] |
| 900 | 7.18 | nitrogen or carbon monoxide, oxygen, carbon dioxide, undetermined inorganics |
| 1000 | 7.90 | nitrogen or carbon monoxide, oxygen, carbon dioxide, undetermined inorganics |

[1] Since the coating is thinned with water and is alkaline, it would absorb the mildly acidic carbon dioxide and these would be the first materials given off.
[2] These masses, although unknown, are not organic, and are presumed to be from a minor break-down of the pigment or binder due to the high temperatures involved.

Finally, a 12 inch by 12 inch aluminum panel, which had been prepared by chemical etching, was coated with the mixture and in the manner of Example II. This panel was then subjected to a vibration test.

In the vibration test, a coated panel was vibrated at 25, 50, and 70 $G_{rms}$ (root mean square gravities) for three minutes at each level with random vibration from 25 to 2000 Hz. The plane of vibration was through the thickness of the panel, considered the most severe mode. Twenty-five $G_{rms}$ is a typical vibration load for structures which would use an optical black coating. In this test, the panel passed without any flaking or loss of adhesion.

EXAMPLE III

The following mixture of ingredients were ball milled:

| Ingredient | Amount |
|---|---|
| Silicate solution | 280 ml |
| Black pigment | 168 gr |
| Distilled water | 170 ml |

The silicate solution was Kasil No. 1, a commercially available silicate sold by the Philadelphia Quartz Company, comprising potassium silicate solution having a weight percentage ratio of potassium oxide to silica (i.e., % $K_2O$ to % $SiO_2$) of 1:2.50 and comprising 70.9% water. The black pigment was Ferro black pigment No. F6331, which comprises the black oxides of manganese, iron and copper and which is taught by U.S. Pat. No. 2,811,463.

The mixture was placed in a one liter polypropylene jar which had been filled to approximately ½ full with a pound of ½ inch diameter by ½ inch tall ceramic cylinders, until both the mixture and cylinders filled the jar to approximately ½ full. The jar was then rotated about its axis at a speed of 90 to 100 rpm for a period of about 15 minutes. The mixture had achieved a sprayable consistency.

An aluminum panel, which had been prepared by chemical milling, was coated with three rub coats and 6 spray coats of the mixture of Example III except that it was more highly milled (3 to 4 hours). Next and after the coating was allowed to dry in an oven for 3 to 5 minutes at 180° F. to 150° F., two spray coats of the mixture of Example III were coated on. The absorptivity of the coating was measured at AM-O and was found to be the following: 0.982 at 15°; 0.981 at 30°; and 0.979 at 45°.

EXAMPLE IV

The following mixture of ingredients were ball milled:

| Ingredient | Amount |
|---|---|
| Silicate solution | 160 ml |
| Black pigment | 130 gr |
| Kaolin | 10 gr |
| Mica | 10 gr |
| Distilled water | 125 ml |

The silicate solution and pigment were the same as those used in Example I. The kaolin used was a commercially available, National Formulary (NF) grade kaolin. The mica employed was 325 mesh, water white mica.

All of the ingredients in the mixture, except for the black pigment, were placed in an 00 size ceramic jar which had been filled to approximately ½ full with 178 inch diameter by ½ inch tall ceramic cylinders, so that both the mixture and the cylinders filled the jar to approximately ½ full. The jar was then rotated about its axis at a speed of 90 to 100 rpm for a period of about one hour. Then, the pigment was added to the ingredients already in the jar and the mixture was then ball milled for an additional 25 minutes, at the same speed as previously used. The mixture had achieved a sprayable consistency.

The mixture of Example IV was applied in four coats to an aluminum panel, prepared by chemical etching, by brushing on two coats, then drying in an oven for 3 to 5 minutes at 180° F. to 150° F., and finally spraying on two surface coats. The resulting surface had a solar absorptivity ($a_s$) of 0.970 at 15° at AM-O and 0.971 at 15° at AM-2.

As is seen, the coating of the present invention when applied in the manner of the present invention produces a surface which possesses a high level of solar absorptivity while being tough and thermally stable. The coats before the final two spray coats can be more highly milled or contain less pigment, but the optical coating is only obtained when the final two surface coats are within the critical limits. Because the earlier coats are not as critical (they still should be inorganic silicate coatings), the coating of the present invention is easily repaired. Where the surface has been damaged, if there is still a "base" coat, i.e., there are enough inorganic base coats to be equivalent to three original base coats, then only two surface coats need be applied in the manner taught by the invention to the surface to restore its optical qualities.

While the invention has been described with reference to certain preferred embodiments thereof, those skilled in the art will appreciate that various changes and modifications and substitutions can be made without departing from the spirit of the invention. It is intended, therefore, that the invention will be limited only by the scope of the claims which follow.

What I claim is:

1. A method of making an optically black surface having a low reflectance of electromagnetic radiation, especially in the solar spectrum, a relatively high heat resistance, and a relatively low amount of off-gassing, comprising the steps of
   (a) Milling the following mixture of ingredients for up to about 25 minutes:

| Ingredient | Amount (% by weight) |
|---|---|
| Alkali metal silicate | 13–21 |
| Black metal oxide pigment | 17–27 |
| Kaolin | 0–5 |
| Mica | 0–3 |
| Water | 50–70 |

(b) Coating the surface to be rendered optically black
      (1) by applying at least four coats of an inorganic composition comprising alkali metal silicate and metal oxide pigment composition, and
      (2) by spraying at least the last two surface coatings, said last two surface coatings being said mixture, and
   (c) Drying at least the coats prior to the last two coats, before applying the last two coats.

2. A method according to claim 1 wherein the alkali metal silicate is in the form of an alkali metal silicate solution.

3. A method according to claim 1 wherein said alkali metal silicate is selected from the group comprising sodium silicate, potassium silicate and lithium silicate.

4. A method according to claim 1 wherein said alkali metal silicate is selected from the group consisting of sodium silicate and potassium silicate.

5. A method according to claim 1 wherein said alkali metal silicate is sodium silicate.

6. A method according to claim 1 wherein said alkali metal silicate is selected from the group comprising sodium silicate solution wherein the percentage weight ratio of $Na_2O$ to $SiO_2$ is in the range of 1:2.40 to 1:3.75, and potassium silicate solution wherein the percentage weight ratio of $K_2O$ to $SiO_2$ is in the range of 1:2.10 to 1:2.50.

7. A method according to claim 1 wherein said pigment comprises at least one black metal oxide.

8. A method according to claim 1 wherein said pigment comprises a mixture of the black oxides of magnesium, copper and iron.

9. A method according to claim 1 wherein said drying step comprises drying for a period of between about 2 to about 4 hours at ambient temperature and humidity conditions, drying for between about 3 to 5 minutes at between about 150° F. and 180° F. and up to 70% relative humidity, or combinations thereof.

10. A method according to claim 1 wherein the surface to be rendered optically black is selected from the group comprising metal, glass and porcelain.

11. A method according to claim 1 wherein the surface is a metal surface selected from the group comprising steel, copper and aluminum.

12. A method according to claim 1 including the further step of pretreating the surface prior to coating it with said mixture.

13. A method according to claim 12 wherein said further step comprises cleaning said surface and, when said surface is metal, subjecting the surface to etching, vapor honing, sand blasting or combinations thereof.

14. A method according to claim 1 wherein said mixture is ball milled for a period of between about 10 minutes and 20 minutes.

15. A method according to claim 1 wherein said ball milling is done using ¼ inch diameter by ¼ inch long porcelain or ceramic cylinders or ¼ to 1 inch porcelain or ceramic balls.

16. A method according to claim 1 wherein said alkali metal silicate and pigment composition comprises said mixture ball milled for about 3 to about 4 hours.

17. A method according to claim 1 wherein said alkali metal silicate and pigment composition comprises the following:

| Ingredient | Amount (% by weight) |
|---|---|
| Alkali metal silicate | 5–21 |
| Black pigment | 17–27 |
| Kaolin | 0–5 |
| Mica | 0–3 |
| Water | 50–70 |

18. A method according to claim 1 wherein said alkali metal silicate and pigment composition comprises said mixture.

19. An optically black surface, having a low reflectance of electromagnetic radiation, especially in the solar spectrum, a relatively high heat resistance, and a relatively low amount of off-gassing, made in accordance with the method of claim 1.

20. A method according to claim 1 wherein said mixture comprises the following:

| Ingredient | Amount |
|---|---|
| Sodium silicate solution | 200 milliliters |
| Black pigment comprised of the black oxides of Fe, Cu & Mn | 175 grams |
| Water | 225 milliliters |

21. An optically black surface, having a low reflectance of electromagnetic radiation, especially in the solar spectrum, a relatively high heat resistance, and a relatively low amount of off-gassing, made in accordance with the method of claim 20.

22. A method according to claim 1 wherein said mixture comprises the following:

| Ingredient | Amount |
|---|---|
| Potassium silicate solution | 280 ml |
| Black pigment comprised of the black oxides of Fe, Cu & Mn | 168 grams |

| Ingredient | Amount |
| --- | --- |
| Water | 170 ml |

23. An optically black surface, having a low reflectance of electromagnetic radiation, especially in the solar spectrum, a relatively high heat resistance, and a relatively low amount of off-gassing, made in accordance with the method of claim 22.

24. A method of making an optically black surface having a low reflectance of electromagnetic radiation, especially in the solar spectrum, a relatively high heat resistance, and a relatively low amount of off-gassing, comprising the steps of:
   (a) Ball milling a mixture of the following ingredients for a period of about 10 minutes to about 20 minutes until the mixture has achieved a sprayable consistency:

| Ingredient | Amount |
| --- | --- |
| Sodium silicate solution | 270–290 milliliters |
| Black pigment | 160–170 grams |
| Water | 160–180 milliliters, | wherein said sodium silicate solution has a percentage weight ratio of $Na_2O$ to $SiO_2$ in the range of 1:2.40 to 1:3.75 and comprises about 50% to 70% by weight $H_2O$, and said black pigment comprises the substantially black oxides of manganese, copper and iron,
   (b) Treating the surface to be rendered optically black in a manner which will enhance the bonding of the silicate coating to said surface, and
   (c) Coating the surface to be rendered optically black
      (1) by applyng at least five coats of an inorganic composition comprising alkali metal silicate and metal oxide pigment composition, and
      (2) by spraying at least the last two coats, said coats being said mixture, and
   (d) Drying at least the coats prior to the two last coats before applyng the last two coats.

25. An optically black surface, having a low reflectance of electromagnetic radiation, especially in the solar spectrum, a relatively high heat resistance, and a relatively low amount of off-gassing, made in accordance with the method of claim 24.

26. A method of making an optically black surface having a low reflectance of electromagnetic radiation, especially in the solar spectrum, a relatively high heat resistance, and a relatively low amount of off-gassing, comprising the steps of:
   (a) Milling the following mixture of ingredients for a period of up to about 3 hours:

| Ingredient | Amount (% by weight) |
| --- | --- |
| Alkali metal silicate | 13 to 21 |
| Kaolin | 0 to 5 |
| Mica | 0 to 3 |
| Water | 50 to 70, |

(b) Adding black metal oxide pigment in an amount of between about 17 and 27% by weight based upon the total weight of the mixture to the mixture of step (a) and continuing the ball milling for an additional period of up to 25 minutes,
   (c) Preparing said surface by treating said surface in a manner which will enhance the adhesion of the silicate coating to the surface,
   (d) Coating the surface to be rendered optically black
      (1) by applying at least five coats of an inorganic composition comprising alkali metal silicate and metal oxide pigment composition, and
      (2) by spraying at least the last two coats, said last two coats comprising said mixture,
   (e) Drying at least the coats prior to the last two coats, prior to coating on said last two coats, and
   (f) Heating the coating to a temperature of between about 250° C. and 350° C. for about 15 minutes to 30 minutes.

27. A method according to claim 26 wherein said alkali metal silicate and pigment composition comprises said mixture.

28. A method according to claim 26 wherein said mica comprises water white mica having a particle size of about 325 mesh.

29. A method according to claim 26 wherein the alkali metal silicate is in the form of an alkali metal silicate solution.

30. A method according to claim 26 wherein said alkali metal silicate is selected from the group comprising sodium silicate, potassium silicate and lithium silicate.

31. A method according to claim 26 wherein said alkali metal silicate is selected from the group consisting of sodium silicate and potassium silicate.

32. A method according to claim 26 wherein said alkali metal silicate is sodium silicate.

33. A method according to claim 26 wherein said alkali metal silicate is selected from the group comprising sodium silicate solution wherein the percentage weight ratio of $Na_2O$ to $SiO_2$ is in the range of 1:2.40 to 1:3.75, and potassium silicate solution wherein the percentage weight ratio of $K_2O$ to $SiO_2$ is in the range of 1:2.10 to 1:2.50.

34. A method according to claim 26 wherein said pigment comprises at least one black metal oxide.

35. A method according to claim 26 wherein said pigment comprises a mixture of the black oxides of magnesium, copper and iron.

36. A method according to claim 26 wherein said drying step comprises drying for a period of about 2 to about 4 hours at ambient temperature and humidity conditions, drying for between about 3 to 5 minutes at between about 150° F. and 180° F. and up to 70% relative humidity, or combinations thereof.

37. A method according to claim 26 wherein the surface to be rendered optically black is selected from the group comprising metal, glass and porcelain.

38. A method according to claim 26 wherein the surface is a metal surface selected from the group comprising steel, copper and aluminum.

39. A method according to claim 26 including the further step of pretreating the surface prior to coating it with said mixture.

40. A method according to claim 26 wherein said further step comprises cleaning said surface and, when said surface is metal, subjecting the surface to etching or vapor honing.

41. A method according to claim 26 wherein said mixture is ball milled for a period of between about 10 minutes and 20 minutes.

42. A method according to claim 26 wherein said ball milling is done using ¼ inch diameter by ¼ inch long porcelain cylinders or ¼ inch to 1 inch porcelain balls.

43. An optically black surface, having a low reflectance of electromagnetic radiation, especially in the solar spectrum, a relatively high heat resistance, and a relatively low amount of off-gassing, made in accordance with the method of claim 26.

44. A method according to claim 26 wherein said mixture comprises the following:

| Ingredient | Amount |
|---|---|
| Sodium silicate solution | 100 ml |
| Black pigment comprised of the black oxides of Fe, Cu & Mn | 75 grams |
| Kaolin | 10 grams |
| Water | 120 ml |

45. An optically black surface, having a low reflectance of electromagnetic radiation, especially in the solar spectrum, a relatively high heat resistance, and a relatively low amount of off-gassing, made in accordance with the method of claim 44.

46. A method according to claim 26 wherein said mixture comprises the following:

| Ingredient | Amount |
|---|---|
| Sodium silicate solution | 150 ml |
| Black pigment comprised of the black oxides of Fe, Cu & Mn | 110 grams |
| Kaolin | 18 grams |
| Mica | 8 grams |
| Water | 100 ml |

47. An optically black surface, having a low reflectance of electromagnetic radiation, especially in the solar spectrum, a relatively high heat resistance, and a relatively low amount of off-gassing, made in accordance with the method of claim 46.

48. A method according to claim 26 wherein said mixture comprises the following:

| Ingredient | Amount |
|---|---|
| Sodium silicate solution | 150-170 ml |
| Black pigment comprised of the black oxides of Fe, Cu & Mn | 120-140 grams |
| Kaolin | 5-15 grams |
| Mica | 5-15 grams |
| Water | 120-130 ml |

49. An optically black surface, having a low reflectance of electromagnetic radiation, especially in the solar spectrum, a relatively high heat resistance, and a relatively low amount of off-gassing, made in accordance with the method of claim 48.

* * * * *

UNITED STATES PATENT AND TRADEMARK OFFICE
CERTIFICATE OF CORRECTION

PATENT NO. : 4,123,591
DATED : October 31, 1978
INVENTOR(S) : Kenneth A. Karki

It is certified that error appears in the above-identified patent and that said Letters Patent are hereby corrected as shown below:

Column 5, Line 27, "17 to 27%" should be --17% to 27%--.

Column 5, Line 43, "1/2 diameter" should be --1/2" diameter--.

Column 5, Line 44, "1/2 to 1 inch" should be --1/2" to 1 inch--.

Column 6, Line 46, "180°F. at up" should be --180°F. to 150°F. at up--.

Column 10, Lines 47 and 48, "with 178 inch diameter" should be --with 1/2" diameter--.

Column 12, Line 23, "1/2 to 1 inch" should be --1/2" to 1 inch--.

Signed and Sealed this

Twenty-seventh Day of March 1979

[SEAL]

Attest:

RUTH C. MASON
Attesting Officer

DONALD W. BANNER
Commissioner of Patents and Trademarks